(12) United States Patent
Lee et al.

(10) Patent No.: US 7,315,406 B2
(45) Date of Patent: Jan. 1, 2008

(54) SCANNING CIRCUIT STRUCTURE

(75) Inventors: Kuan-Yu Lee, Taichung (TW); Chen-Ho Lee, Hsinchu (TW)

(73) Assignee: Transpacific IP, Ltd., Taipei (TW)

( * ) Notice: Subject to any disclaimer, the term of this patent is extended or adjusted under 35 U.S.C. 154(b) by 957 days.

(21) Appl. No.: 10/064,265

(22) Filed: Jun. 27, 2002

(65) Prior Publication Data

US 2004/0001236 A1 Jan. 1, 2004

(51) Int. Cl.
*H04N 1/04* (2006.01)
*H04N 1/32* (2006.01)

(52) U.S. Cl. .................. 358/482; 358/474; 358/483; 358/442; 358/468

(58) Field of Classification Search .............. 358/482, 358/483, 468, 442, 434, 474, 484, 497, 494, 358/445, 409, 412, 505, 506, 512–514; 250/208.1, 250/234–236, 208.2, 312, 318, 319; 382/312, 382/318, 319; 359/212; 399/211, 212
See application file for complete search history.

(56) References Cited

U.S. PATENT DOCUMENTS

| | | | | |
|---|---|---|---|---|
| 5,627,603 A | * | 5/1997 | Sakai | 348/708 |
| 6,002,508 A | * | 12/1999 | Mai | 359/212 |
| 6,084,691 A | * | 7/2000 | Tsai et al. | 358/474 |
| 6,801,254 B1 | * | 10/2004 | Nishio | 348/241 |

FOREIGN PATENT DOCUMENTS

JP 2002218185 A * 8/2002
JP 2003110798 A * 4/2003

* cited by examiner

*Primary Examiner*—Cheukfan Lee
(74) *Attorney, Agent, or Firm*—Stolowitz Ford Cowger LLP

(57) ABSTRACT

A scanning circuit having rearranged circuit modules at each end of a flat cable. After the rearrangement, the flat cable carries scanning control signals produced by a conventional IC communication interface instead of timing signals and carries digital image data instead of easily distorted and interfered analog image signals.

31 Claims, 1 Drawing Sheet

SCANNING CIRCUIT STRUCTURE

BACKGROUND OF INVENTION

1. Field of Invention

The present invention relates to a scanner. More particularly, the present invention relates to scanning circuit structure.

2. Description of Related Art

In recent years, rapid progress in digital technologies has lead to the development of Internet and multimedia systems. Accompanying this trend, a large number of analog images are routinely converted into a digital format to facilitate processing. A digital camera (DC) is used to extract an image from an actual scene. Similarly, an optical scanner is used to extract textual data from a document or image data from a picture. The extracted data is converted into a digital format so that a computer or electronic equipment may display an image, carry out an optical character recognition, edit the data, store up the data or simply output to some devices.

According to the method of inputting document image, optical scanners may be classified as a palmtop scanner, a sheet feed scanner, a drum scanner or a flatbed scanner. FIG. 1 is a diagram showing the circuit structure of a conventional scanner. As shown in FIG. 1, the circuit includes an optical sensor circuit module 120 and a main circuit module 110. Each circuit module is fabricated on a printed circuit board. The circuit modules 110 and 120 communicate with each other through a flat cable 130. In general, the main circuit module 110 is fixed inside the lower casing of a scanner while the optical sensor circuit module 120 is attached to a scanning module capable of moving longitudinally. The optical sensor circuit module 120 has a charge-coupled device 140 therein. The charge-coupled device 140 can sense the light reflected from the image within a scan document to produce analog image signals. The analog image signals are transmitted to the main circuit module 120 by a form of analog voltage signals through the flat cable 130. The main circuit module 120 processes the analog image signals and converts the analog image signals into digital image data, so as to provide a user to retrieve the digital image data file to carry out various operations including image display, optical character recognition, editing, data archiving or data transfer through a computer or other electronic device. In addition, to capture the image produced by the reflected light while scanning the document, the charge-coupled device 140 must receive timing control signals from the main circuit module 120 as well. Hence, the flat cable 130 must carry both timing control signals and analog image signals.

When demand for image quality is low, a flat cable is adequate because the quantity of image data that needs to be transferred is small. However, due to rapid expansion of computer power, the production of a high-quality scan image at a shorter scan period is always in demand. Eventually, to meet these demands, the flat cable has to carry greater quantities of analog image signals and timing control signals. In other words, the flat cable not only has to transmit signal at a higher rate, but also has to increase the number of transmission lines for transmitting timing control signals. The additional transmission lines for carrying control signals may cause electromagnetic interference (EMI) of analog image signals. Ultimately, image data may be distorted.

SUMMARY OF INVENTION

Accordingly, one object of the present invention is to provide a scanning circuit structure for a scanner capable of reducing distortion during high-speed image signal transmission so that electromagnetic interference is minimized and quality of transmitted image is improved.

To achieve these and other advantages and in accordance with the purpose of the invention, as embodied and broadly described herein, the invention provides a scanning circuit structure for a document scanner. The scanning circuit includes a main circuit module and an optical sensor circuit module. The main circuit module receives a scanning instruction from a communication interface and converts the scanning instruction into scan control signals. The scan control signals are passed to a connection cable. In the meantime, the main circuit module also receives digital image data of a scan document from the connection cable. The optical sensor circuit module is connected to the main circuit module via the connection cable. The optical sensor circuit module receives the scan control signals and converts the scan control signal into timing control signals. Hence, operations including the scanning of a document, the extraction of an analog image signal and the conversion of the analog image signal into a digital image data are executed in sequence.

In one embodiment of this invention, the main circuit module includes a main control logic unit, a memory unit and a memory control logic unit. The optical sensor circuit module includes an optical sensor, an analog front-end processor, an analog/digital converter and a timing signal generator. The main control logic unit in the main control module receives scanning instructions and converts the instructions into scanning control signals. The main control logic also receives digital image data scanned from a document. The memory unit stores digital image data. The memory control logic unit is coupled to the main control logic unit and the memory unit for controlling the access of digital image data. The optical sensor inside the optical sensor circuit module is used to sense an analog image signal that is formed by the light reflected from the document. The analog front-end processor is coupled to the optical sensor for pre-processing the analog image. The analog/digital converter is coupled to the front-end processor for converting the pre-processed analog image signal into digital image data. The timing signal generator is coupled to the optical sensor and the analog/digital converter for producing timing control signals, so as to control the scanning process on the document, produce the analog image signal of the document, and convert the analog image signal into the digital image data.

The main control logic unit in this invention also includes an image front-end processor for compensating and adjusting the captured digital image data so that the scanned image has a better quality. In general, the memory unit contains dynamic random access memory and the optical sensor is a charge-coupled device (CCD) or a CMOS image sensor. The connection cable linking the main circuit module and the optical sensor circuit module include a flat cable and the scanning circuit interfaces with a computer through a universal serial bus (USB). The scanning control signals are transmitted through an IIC or 3-wire IC communication interface.

In this invention, digital image data are transmitted instead of analog image signals. Furthermore, the scanning control signals are transmitted through a common IC communication interface instead of timing control signals transmitted through a connection cable. Through this arrangement, image data distortion due to high-speed transmission is greatly minimized. Hence, electromagnetic interference is minimized and quality of image transmitted by the scanner is improved.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
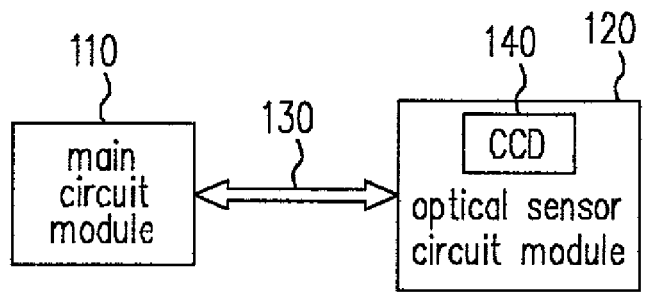
FIG. 1 is a diagram showing the circuit structure of a conventional scanner.

Reference will now be made in detail to the present preferred embodiments of the invention, examples of which are illustrated in the accompanying drawings. Wherever possible, the same reference numbers are used in the drawings and the description to refer to the same or like parts.

Figure 2:
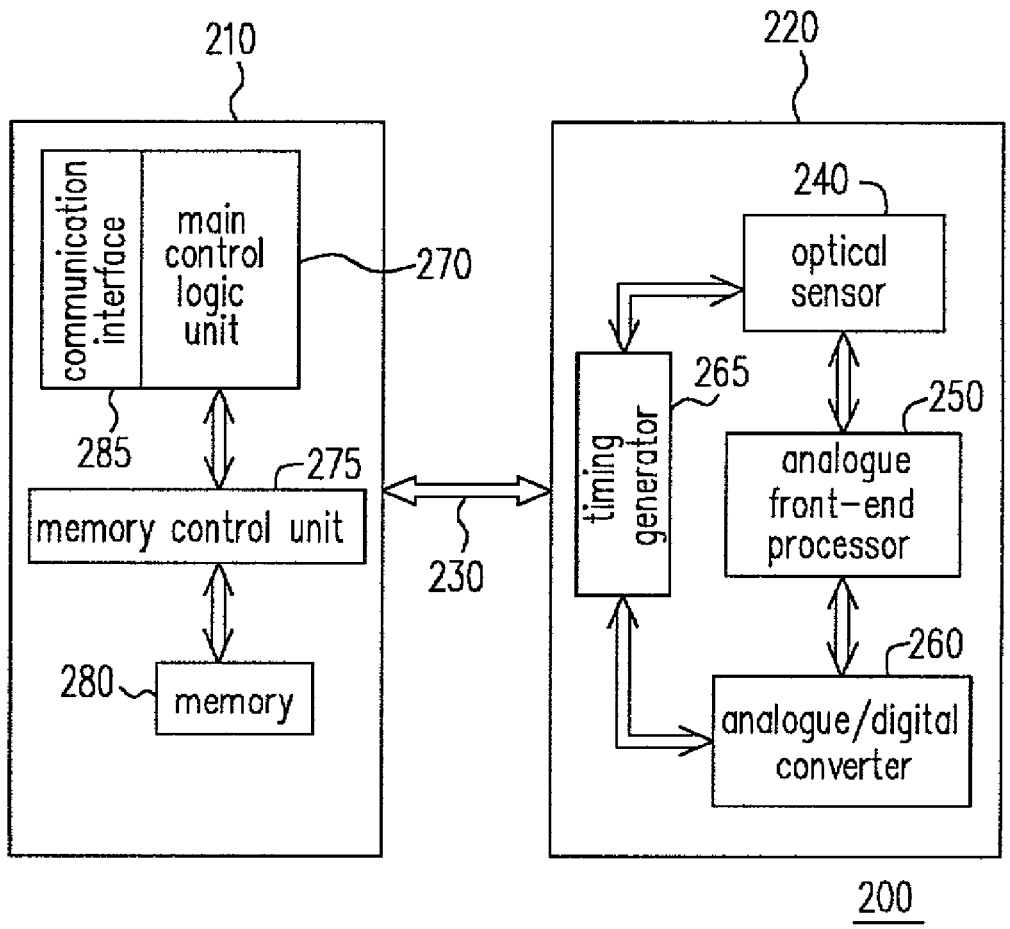
FIG. 2 is a diagram showing the circuit structure of a scanner according to one preferred embodiment of this invention.

FIG. 2 is a diagram showing the circuit structure of a scanner according to one preferred embodiment of this invention. As shown in FIG. 2, the scanning circuit 200 is responsible for controlling the entire process of scanning a document. The scanning circuit 200 includes a main circuit module 210 and an optical sensor circuit module 220. The main circuit module 210 and the optical sensor circuit module 220 are linked together through a connection cable 230 such as a flat cable. The flat cable carries both scan control signals and digital image data. The main circuit module 210 further includes a main control logic unit 270, a memory unit 280 and a memory control logic unit 275. The optical sensor circuit module 220 further includes an optical sensor 240, an analog front-end processor (AFE) 250, an analog/digital converter 260 and a timing signal generator 265.

The main control logic unit 270 in the main circuit module 210 connects with the human/machine interface of a personal computer (not shown) through a communication interface 285. Here, the communication interface 285 can be a universal serial bus (USB) interface or an enhanced parallel port (EPP) interface, for example. The communication interface 285 receives important scanning instructions regarding image resolution, brightness level and scanning range and converts the scanning instructions into scanning control signals that pass along the connection cable 230.

When the optical sensor circuit module 220 receives scanning control signals from the main circuit module 210, the timing generator 265 produces the required timing control signals for extracting an analog image signal from the optical sensor 240. The optical sensor 240 is a charge-coupled device (CCD) or a CMOS image sensor, for example. The captured analog image signal is preprocessed by the analog front-end preprocessor 250. Thereafter, the pre-processed analog image is transmitted to the analog/digital converter 260 and converted to digital image data.

The digital image data is subsequently transmitted to the main circuit module 210 through the connection cable 230. At this moment, the data transmitted on the connection cable 230 is no longer the analog signal that easily has the distortion but is the digital image data that can be easily transmitted in a fast speed. As a result, it can effectively solve the issue about difficulty on maintaining the scanning quality when the scanning process is operated in the fast speed.

On receiving the digital image data, the main circuit module 210 transfers the data to the memory unit 280 via the memory controller 275. The memory unit 280 may contain conventional types of memory such as synchronous or non-synchronous dynamic random access memory (DRAM) or static random access memory (SRAM). Obviously, the main control logic unit 270 may incorporate an image preprocessor (not shown) for compensating and adjusting the captured digital image data so that the scanned image can have better quality. In addition, timing signals may have to be adjusted due to the change in connection between the communication interface of various integrated circuits (ICs).

In conclusion, major advantages of this invention include:

1. Since the flat cable transmits digital data instead of easily distorted analog image signals, a clearer image can be obtained at a higher scanning speed.

2. Since the flat cable transmits scanning control signals between conventional IC communication interfaces instead of timing control signals, the effect due to electromagnetic interference is greatly minimized.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. A scanning circuit for a document scanner, comprising:
    a main circuit module capable of receiving a scanning instruction from a communication interface, converting the scanning instruction into scan control signals, passing the scan control signals to a connection cable as well as receiving a digital image data captured in a document scanning operation through the connection cable; and
    an optical sensor circuit module connected to the main circuit module through the connection cable capable of receiving the scan control signals and converting the scan control signals to timing control signals that control document scanning, extraction of an analog image signal from the document and conversion of the analog image signal into the digital image data.

2. The scanning circuit of claim 1, wherein the main circuit module further includes: a main control logic unit capable of receiving the scanning instruction and converting the scanning instruction into scan control signals and receiving digital image data; a memory unit capable of holding the digital image data; and a memory control logic unit coupled to the main control logic unit and the memory unit capable of controlling the access of digital image data.

3. The scanning circuit of claim 2, wherein the main control logic unit further includes an image preprocessor capable of compensating and adjusting the digital image data.

4. The scanning circuit of claim 2, wherein the memory comprises a dynamic random access memory.

5. The scanning circuit of claim 1, wherein the optical sensor circuit module further includes: an optical sensor capable of detecting and producing the analog image signal; an analog front-end processor coupled to the optical sensor capable of preprocessing the analog image signal; an analog/digital converter coupled to the analog front-end processor capable of converting the pre-processed analog image signal into the digital image data; and a timing generator coupled to the optical sensor and the analog/digital converter capable of generating the timing control signals that control a generation of the analog image signal and a conversion of the analog image signal into the digital image data.

6. The scanning circuit of claim 5, wherein the optical sensor includes a charge-coupled device.

7. The scanning circuit of claim 5, wherein the optical sensor includes a complementary metal-oxide-semiconductor (CMOS) image sensor.

8. The scanning circuit of claim 1, wherein the connection cable includes a flat cable.

9. The scanning circuit of claim 1, wherein the communication interface includes a universal serial bus interface.

10. The scanning circuit of claim 1, wherein the scan control signals are capable of being transmitted through an integrated circuit (IC) communication interface.

11. A scanning method, comprising:
receiving scan control signals at an optical sensor circuit module via a connection cable; and
converting the scan control signals to timing control signals to control document scanning.

12. The method of claim 11, further comprising:
receiving a scanning instruction from a communication interface via a main circuit module;
converting the scanning instruction into scan control signals; and
passing the scan control signals to the connection cable.

13. The method of claim 12, further comprising:
extracting an analog image signal captured in a document scanning operation from a document at said optical sensor circuit module;
converting the analog image signal into a digital image data at said optical sensor circuit module; and
receiving the digital image data at said main circuit module through the connection cable.

14. The method of claim 13, further comprising:
receiving the scanning instruction and converting the scanning instruction into scan control signals and receiving digital image data at the main circuit module via a main control logic unit;
holding the digital image data at the main circuit module via a memory unit; and
controlling the access of digital image data at the main circuit module via a memory control logic unit coupled to the main control logic unit and the memory unit.

15. The method of claim 14, further comprising compensating and adjusting the digital image data at the main control logic unit via an image preprocessor.

16. The method of claim 13, further comprising:
detecting and producing the analog image signal at the optical sensor circuit module via an optical sensor;
preprocessing the analog image signal at the optical sensor circuit module via an analog front-end processor coupled to the optical sensor;
converting the pre-processed analog image signal into the digital image data at the optical sensor circuit module via an analog/digital converter coupled to the analog front-end processor; and
generating the timing control signals that control a generation of the analog image signal and a conversion of the analog image signal into the digital image data at the optical sensor circuit module via a timing generator coupled to the optical sensor and the analog/digital converter.

17. A scanning method, comprising:
extracting an analog image signal captured in a document scanning operation from a document at an optical sensor circuit module including an optical sensor;
converting the analog image signal into a digital image data at said optical sensor circuit module;
receiving the digital image data from said optical sensor circuit module at a main circuit module through a connection cable; and
generating timing control signals that control a generation of the analog image signal and a conversion of the analog image signal into the digital image data at the optical sensor circuit module via a timing generator coupled to the optical sensor and an analog/digital converter.

18. The method of claim 17, further comprising:
holding the digital image data at the main circuit module via a memory unit; and
controlling the access of digital image data at the main circuit module via a memory control logic unit coupled to a main control logic unit and the memory unit.

19. The method of claim 18, further comprising compensating and adjusting the digital image data at the main control logic unit via an image preprocessor.

20. The method of claim 17, further comprising:
detecting and producing the analog image signal at the optical sensor circuit module via an optical sensor;
preprocessing the analog image signal at the optical sensor circuit module via an analog front-end processor coupled to the optical sensor; and
converting the pre-processed analog image signal into the digital image data at the optical sensor circuit module via an analog/digital converter coupled to the analog front-end processor.

21. A scanning apparatus, comprising:
means for extracting an analog image signal captured in a document scanning operation from a document at an optical sensor circuit module;
means for converting the analog image signal into a digital image data at said optical sensor circuit module;
means for receiving the digital image data from said optical sensor circuit module at a main circuit module through a connection cable; and
means for generating timing control signals that control a generation of the analog image signal and a conversion of the analog image signal into the digital image data at the optical sensor circuit module.

22. The apparatus of claim 21, further comprising:
means for receiving a scanning instruction from a communication interface at said main circuit module;
means for converting the scanning instruction into scan control signals;
means for passing the scan control signals to said connection cable;
means for receiving the scan control signals at said optical sensor circuit module via the connection cable; and
means for converting the scan control signals to timing control signals to control document scanning.

23. The apparatus of claim 22, further comprising:
means for holding the digital image data at the main circuit module; and means for controlling the access of the digital image data at the main circuit module.

24. The apparatus of claim 21, further comprising means for compensating and adjusting the digital image data at the main circuit module.

25. The apparatus of claim 21, further comprising:
means for preprocessing the analog image signal a the optical sensor circuit module; and
means to converting the pre-processed analog image signal into the digital image data at the optical sensor circuit module.

26. A scanner, comprising:
a scanning module, the scanning module including a main circuit module and an optical sensor circuit module;
the main circuit module capable of receiving a scanning instruction from a communication interface, converting the scanning instruction into scan control signals, passing the scan control signals to a connection cable as well as receiving a digital image data captured in a document scanning operation through the connection cable; and
the optical sensor circuit module connected to the main circuit module through the connection cable capable of receiving the scan control signals and converting the scan control signals to timing control signals that control document scanning, extraction of an analog image signal from the document and conversion of the analog image signal into the digital image data.

27. The scanner of claim 26, wherein the main circuit module further includes: a main control logic unit capable of receiving the scanning instruction and converting the scanning instruction into scan control signals and receiving digital image data; a memory unit capable of holding the digital image data; and a memory control logic unit coupled to the main control logic unit and the memory unit capable of controlling the access of digital image data.

28. The scanner of claim 27, wherein the main control logic unit further includes an image preprocessor capable of compensating and adjusting the digital image data.

29. The scanner of claim 26, wherein the optical sensor circuit module further includes: an optical sensor capable of detecting and producing the analog image signal; an analog front-end processor coupled to the optical sensor capable of preprocessing the analog image signal; an analog/digital converter coupled to the analog front-end processor capable of converting the pre-processed analog image signal into the digital image data; and a timing generator coupled to the optical sensor and the analog/digital converter capable of generating the timing control signals that control a generation of the analog image signal and a conversion of the analog image signal into the digital image data.

30. An apparatus, comprising:
an optical sensor circuit module capable of being connected to a main circuit module through a connection cable,
wherein the optical sensor circuit module is capable of receiving scan control signals from the main circuit module and converting the scan control signals to timing control signals that control document scanning, and
wherein the optical sensor circuit module is capable of extraction of an analog image signal from the document and conversion of the analog image signal into digital image data.

31. The apparatus of claim 30, wherein the optical sensor circuit module further includes: an optical sensor capable of detecting and producing the analog image signal; an analog front-end processor coupled to the optical sensor capable of preprocessing the analog image signal; an analog/digital converter coupled to the analog front-end processor capable of converting the pre-processed analog image signal into the digital image data; and a timing generator coupled to the optical sensor and the analog/digital converter capable of generating the timing control signals that control a generation of the analog image signal and a conversion of the analog image signal into the digital image data.

* * * * *

UNITED STATES PATENT AND TRADEMARK OFFICE
CERTIFICATE OF CORRECTION

PATENT NO. : 7,315,406 B2  Page 1 of 1
APPLICATION NO. : 10/064265
DATED : January 1, 2008
INVENTOR(S) : Lee et al.

It is certified that error appears in the above-identified patent and that said Letters Patent is hereby corrected as shown below:

At column 7, line 3, please replace "and means" with --and¶means--.
At column 7, line 4, please replace "the digital" with --digital--.
At column 7, line 9, please replace "signal a the" with --signal at the--.
At column 7, line 11, please replace "means to" with --means for--.

Signed and Sealed this

First Day of June, 2010

David J. Kappos
*Director of the United States Patent and Trademark Office*